US012047385B2

(12) United States Patent
Kharate et al.

(10) Patent No.: US 12,047,385 B2
(45) Date of Patent: Jul. 23, 2024

(54) INTEROPERABLE UNLOCKING TECHNOLOGY FOR WIRELESS DEVICES

(71) Applicant: T-Mobile USA, Inc., Bellevue, WA (US)

(72) Inventors: Sanjay Laxman Kharate, Sammamish, WA (US); Smitha Ranjitha Royadu Lingala, Bothell, WA (US); Ravikumar Subramanian, Bothell, WA (US); Vadhan Ragoubady, Renton, WA (US); Brian G. Holsclaw, Seattle, WA (US); Vijay B. Yelmat, Phoenix, AZ (US); Timothy Potter, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 255 days.

(21) Appl. No.: 17/740,099

(22) Filed: May 9, 2022

(65) Prior Publication Data

US 2023/0362171 A1    Nov. 9, 2023

(51) Int. Cl.
*H04L 9/40* (2022.01)
*H04W 12/30* (2021.01)

(52) U.S. Cl.
CPC ........ *H04L 63/105* (2013.01); *H04L 63/0884* (2013.01); *H04L 63/108* (2013.01); *H04W 12/35* (2021.01)

(58) Field of Classification Search
CPC . H04L 63/105; H04L 63/0884; H04L 63/108; H04W 12/35; H04W 12/08
See application file for complete search history.

(56) References Cited

U.S. PATENT DOCUMENTS

| 5,864,757 | A | 1/1999 | Parker |
| 6,314,108 | B1 | 11/2001 | Ramasubramani et al. |
| 7,840,204 | B2 | 11/2010 | Bandaru |
| 8,050,705 | B2 | 11/2011 | Sicher et al. |
| 8,195,140 | B2 | 6/2012 | Knezevic |

(Continued)

FOREIGN PATENT DOCUMENTS

| CN | 103324881 A | 9/2013 |
| CN | 103617659 A | 3/2014 |

(Continued)

*Primary Examiner* — Amie C. Lin
(74) *Attorney, Agent, or Firm* — Perkins Coie LLP (57) ABSTRACT

A system performs interoperable operations to unlock different wireless devices on different wireless networks. The system can receive requests to unlock wireless devices that are locked based on different restrictions, where unlocking requires performing different unlock processes that are normally exclusive to respective carriers, networks, or types of devices. The system can coordinate the interoperable operations to remove the restrictions based on requirements defined for the unlock processes. In particular, the system can identify a policy engine and a network resource to determine whether a particular wireless device is eligible for being unlocked and then utilize the network resource to unlock the wireless device. The system can unlock the different wireless devices by coordinating the same operations with different policy engines and network resources of different carriers, networks, or device manufacturers.

19 Claims, 5 Drawing Sheets

(56) References Cited

U.S. PATENT DOCUMENTS

| | | | |
|---|---|---|---|
| 8,249,556 B2 | 8/2012 | Olsen et al. | |
| 8,473,743 B2 | 6/2013 | Freedman et al. | |
| 8,593,249 B2 | 11/2013 | Bliding et al. | |
| 8,593,953 B2 | 11/2013 | Marbach et al. | |
| 8,594,026 B1 | 11/2013 | Hirschman et al. | |
| 8,634,821 B2 | 1/2014 | Raleigh | |
| 8,645,002 B2 | 2/2014 | Gray et al. | |
| 8,667,562 B2 | 3/2014 | Lebeau et al. | |
| 8,727,873 B2 | 5/2014 | Frady | |
| 8,791,790 B2 | 7/2014 | Robertson et al. | |
| 8,813,198 B2 | 8/2014 | Louboutin et al. | |
| 8,826,415 B2 | 9/2014 | Last | |
| 8,831,568 B2 | 9/2014 | Cherian et al. | |
| 8,841,987 B1 | 9/2014 | Stanfield et al. | |
| 8,854,180 B2 | 10/2014 | Bacarella | |
| 9,186,071 B2 | 11/2015 | Moriarty et al. | |
| 9,198,045 B1 | 11/2015 | Ghoshal et al. | |
| 9,319,884 B2 | 4/2016 | Buzescu et al. | |
| 9,336,635 B2 | 5/2016 | Robertson et al. | |
| 9,367,975 B2 | 6/2016 | Robertson et al. | |
| 9,510,199 B2 | 11/2016 | Govindhasamy | |
| 9,510,376 B2 | 11/2016 | Wang et al. | |
| 9,520,045 B2 | 12/2016 | Hawkins | |
| 9,549,323 B2 | 1/2017 | Lee et al. | |
| 9,558,604 B2 | 1/2017 | Robertson et al. | |
| 9,596,365 B2 | 3/2017 | Abe | |
| 9,609,510 B2 | 3/2017 | Raleigh et al. | |
| 9,614,829 B1 | 4/2017 | Molina-Markham et al. | |
| 9,619,127 B2 | 4/2017 | Varner et al. | |
| 9,710,984 B2 | 7/2017 | Benkert et al. | |
| 9,715,379 B2 | 7/2017 | He et al. | |
| 9,767,630 B1 | 9/2017 | Kazerani et al. | |
| 9,785,761 B2 | 10/2017 | Rao | |
| 9,791,843 B1 | 10/2017 | Reiser et al. | |
| 9,807,607 B2 | 10/2017 | Velusamy | |
| 9,813,399 B2 | 11/2017 | Velusamy | |
| 9,832,678 B1 | 11/2017 | Tandon et al. | |
| 9,852,562 B2 | 12/2017 | Belhadia et al. | |
| 9,877,173 B2 | 1/2018 | Soelberg et al. | |
| 9,900,162 B2 | 2/2018 | Woxland et al. | |
| 9,975,647 B2 | 5/2018 | Fleck et al. | |
| 10,085,135 B2 | 9/2018 | Robertson et al. | |
| 10,089,457 B2 | 10/2018 | Liu et al. | |
| 10,089,810 B1 | 10/2018 | Kaye et al. | |
| 10,091,658 B2 | 10/2018 | Zhang et al. | |
| 10,115,256 B2 | 10/2018 | Davis | |
| 10,158,992 B2 | 12/2018 | Oh et al. | |
| 10,176,655 B2 | 1/2019 | Gullicksen | |
| 10,183,648 B2 | 1/2019 | Yamamoto et al. | |
| 10,225,839 B2 | 3/2019 | Watts | |
| 10,255,740 B2 | 4/2019 | Duan et al. | |
| 10,271,200 B2 | 4/2019 | Lloyd et al. | |
| 10,299,304 B1 | 5/2019 | Hintermeister et al. | |
| 10,339,293 B2 | 7/2019 | Yang et al. | |
| 10,395,452 B2 | 8/2019 | Morrison et al. | |
| 10,440,574 B2 | 10/2019 | Ledvina et al. | |
| 10,467,415 B2 | 11/2019 | Finger | |
| 10,592,643 B2 | 3/2020 | Hodge | |
| 10,783,232 B2 | 9/2020 | Bolotin et al. | |
| 10,783,731 B2 | 9/2020 | Imanuel | |
| 10,893,411 B2 | 1/2021 | Finger | |
| 10,993,107 B2 | 4/2021 | Chien et al. | |
| 11,184,771 B1 | 11/2021 | Kim | |
| 2004/0192339 A1 | 9/2004 | Wilson et al. | |
| 2005/0003830 A1 | 1/2005 | Campbell | |
| 2005/0037732 A1 | 2/2005 | Kotzin | |
| 2006/0139149 A1 | 6/2006 | Faro et al. | |
| 2007/0296545 A1 | 12/2007 | Clare | |
| 2007/0300063 A1 | 12/2007 | Adams et al. | |
| 2008/0090614 A1* | 4/2008 | Sicher | H04W 8/205 455/414.1 |
| 2010/0201536 A1 | 8/2010 | Robertson et al. | |
| 2010/0207723 A1 | 8/2010 | Cao et al. | |
| 2011/0258251 A1 | 10/2011 | Antoci | |
| 2012/0042396 A1 | 2/2012 | Guerra et al. | |
| 2012/0054832 A1 | 3/2012 | Ghosh et al. | |
| 2012/0058743 A1* | 3/2012 | Chen | H04L 63/102 455/411 |
| 2012/0149329 A1 | 6/2012 | Mahmood et al. | |
| 2012/0171996 A1 | 7/2012 | Mocanu et al. | |
| 2013/0244684 A1 | 9/2013 | Kadous et al. | |
| 2013/0335193 A1 | 12/2013 | Hanson et al. | |
| 2014/0125453 A1 | 5/2014 | Mcintyre et al. | |
| 2014/0254499 A1 | 9/2014 | Hassan et al. | |
| 2015/0304316 A1 | 10/2015 | Ye et al. | |
| 2015/0327052 A1 | 11/2015 | Ghai | |
| 2017/0094525 A1* | 3/2017 | Salkini | H04W 12/08 |
| 2017/0124510 A1 | 5/2017 | Caterino et al. | |
| 2018/0115418 A1 | 4/2018 | Lakin | |
| 2020/0050324 A1 | 2/2020 | Gavara | |
| 2020/0050352 A1 | 2/2020 | Bates | |
| 2020/0351654 A1* | 11/2020 | Finger | H04L 63/20 |
| 2021/0103707 A1 | 4/2021 | Bergman et al. | |
| 2021/0136580 A1 | 5/2021 | Bjelcevic et al. | |
| 2021/0211537 A1 | 7/2021 | Ramprasad | |
| 2021/0250765 A1 | 8/2021 | Vargas et al. | |
| 2021/0303667 A1 | 9/2021 | Senn | |
| 2021/0400512 A1 | 12/2021 | Agarwal et al. | |
| 2022/0051511 A1 | 2/2022 | Schmidt et al. | |
| 2022/0070946 A1 | 3/2022 | Shah | |
| 2022/0078618 A1 | 3/2022 | Kim | |

FOREIGN PATENT DOCUMENTS

| | | |
|---|---|---|
| CN | 103195303 B | 12/2014 |
| CN | 104850774 A | 8/2015 |
| CN | 104157045 B | 9/2015 |
| CN | 103617660 B | 12/2015 |
| CN | 102930621 B | 1/2016 |
| CN | 103617661 B | 2/2016 |
| CN | 106655484 A | 5/2017 |
| CN | 106997632 A | 8/2017 |
| CN | 107046686 A | 8/2017 |
| CN | 104517336 B | 11/2017 |
| CN | 107622547 A | 1/2018 |
| CN | 107729742 A | 2/2018 |
| CN | 107808090 A | 3/2018 |
| CN | 107885988 A | 4/2018 |
| CN | 104735168 B | 9/2018 |
| CN | 109035490 A | 12/2018 |
| CN | 109285241 A | 1/2019 |
| CN | 110073420 A | 7/2019 |
| CN | 110276871 A | 9/2019 |
| CN | 110349394 A | 10/2019 |
| CN | 111402455 A | 7/2020 |
| CN | 110751755 B | 2/2021 |
| CN | 112419549 A | 2/2021 |
| CN | 112419696 A | 2/2021 |
| CN | 112466047 A | 3/2021 |
| CN | 113140056 A | 7/2021 |
| CN | 113194468 A | 7/2021 |
| CN | 113256858 A | 8/2021 |
| CN | 110599641 B | 10/2021 |
| DE | 102019218394 A1 | 6/2020 |
| DE | 112018005558 T5 | 6/2020 |
| EP | 1037447 A2 | 9/2000 |
| EP | 1870832 B1 | 9/2009 |
| EP | 2839687 A1 | 2/2015 |
| EP | 3179758 A1 | 6/2017 |
| EP | 2813963 B1 | 7/2017 |
| EP | 3293995 A1 | 3/2018 |
| EP | 3351027 A1 | 7/2018 |
| EP | 3391342 A1 | 10/2018 |
| EP | 3407582 A1 | 11/2018 |
| EP | 3533037 A1 | 9/2019 |
| EP | 3180731 B1 | 7/2021 |
| EP | 3419346 B1 | 7/2021 |
| EP | 3859573 A1 | 8/2021 |
| JP | 5080857 B2 | 9/2012 |
| JP | 2012219440 A | 11/2012 |
| JP | 5891934 B2 | 3/2016 |
| JP | 6414526 B2 | 10/2018 |
| JP | 2020141199 A | 9/2020 |
| KR | 200361322 Y1 | 9/2004 |

(56) References Cited

FOREIGN PATENT DOCUMENTS

| | | |
|---|---|---|
| KR | 20040111157 A | 12/2004 |
| KR | 20050089662 A | 9/2005 |
| KR | 20050118455 A | 12/2005 |
| KR | 20060036981 A | 5/2006 |
| KR | 100618267 B1 | 9/2006 |
| KR | 100638025 B1 | 10/2006 |
| KR | 100693339 B1 | 3/2007 |
| KR | 100723700 B1 | 5/2007 |
| KR | 100728298 B1 | 6/2007 |
| KR | 100795587 B1 | 1/2008 |
| KR | 20140136603 A | 12/2014 |
| KR | 101595849 B1 | 2/2016 |
| KR | 101633224 B1 | 6/2016 |
| KR | 20170089663 A | 8/2017 |
| KR | 20190014192 A | 2/2019 |
| KR | 102227461 B1 | 3/2021 |
| KR | 20210133828 A | 11/2021 |
| WO | 2013161233 A1 | 10/2013 |
| WO | 2014187848 A1 | 11/2014 |
| WO | 2015117674 A1 | 8/2015 |
| WO | 2015180126 A1 | 12/2015 |
| WO | 2015191190 A1 | 12/2015 |
| WO | 2016005795 A1 | 2/2016 |
| WO | 2016023558 A1 | 2/2016 |
| WO | 2016123926 A1 | 8/2016 |
| WO | 2016184195 A1 | 11/2016 |
| WO | 2018105850 A1 | 6/2018 |
| WO | 2018188239 A1 | 10/2018 |
| WO | 2019168782 A1 | 9/2019 |
| WO | 2020133500 A1 | 7/2020 |
| WO | 2020164104 A1 | 8/2020 |
| WO | 2020223171 A1 | 11/2020 |
| WO | 2020231758 A1 | 11/2020 |
| WO | 2020232854 A1 | 11/2020 |
| WO | 2020240038 A1 | 12/2020 |
| WO | 2021043396 A1 | 3/2021 |
| WO | 2021043398 A1 | 3/2021 |
| WO | 2021162927 A1 | 8/2021 |
| WO | 2021221225 A1 | 11/2021 |

\* cited by examiner

INTEROPERABLE UNLOCKING TECHNOLOGY FOR WIRELESS DEVICES

BACKGROUND

Subscriber Identification Module (SIM) unlock, device unlock, network unlock, or carrier unlock refers to a technical restriction built into wireless devices (e.g., mobile phones) for use by wireless carriers to restrict the use of the mobile phones to specific regions or networks. Generally, a mobile phone can be locked to accept a SIM card with certain International Mobile Subscriber Identities (IMSIs), which can be restricted by a Mobile Country Code (MCC), a Mobile Network Code (MNC), or a Mobile Subscriber Identification Number (MS IN). Besides the locking, wireless devices can have firmware that is specific to the network provider. The firmware is installed by the service provider and is separate from the locking mechanism. A reason that network providers lock their wireless devices is that they offer devices at a discount to customers in exchange for a contract to pay for the use of the network for a specified period.

A wireless device can be unlocked to use on another wireless carrier's network. The wireless devices can be unlocked by online services that have access to the manufacturer and/or with telecommunication networks. In one example, unlocking requires entering a code, for a wireless device to be unlocked, into an unlocking system. The code is provided by the network operator, where the unlock code is verified by the wireless device. Other mechanisms include using software running on the handset (e.g., an app) or a computer attached to the handset, hardware devices that connect to the handset or over-the-air by the wireless carrier. The unlock code is typically generated by an algorithm such as a one-way hash. Network providers can change the original factory unlock codes as an extra layer of security against unlocking services. In one example, unlock codes are generated from an IMEI number and country and operator details using the algorithm specific to the handset. Other manufacturers have taken a more cautious approach and embed a random number in the handset's firmware that is retained by the manufacturer and the network on whose behalf the lock was applied. For certain device types, cryptographic keys to unlock device are also provided by operator to OEMs. For e.g., in Remote SIM Unlock.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed unlock technology provides a unified and interoperable way to unlock wireless devices to operate on multiple wireless networks. Typical unlock technology enables wireless devices to switch from operating on one wireless network to another wireless network to accommodate, for example, international travel or to sell the wireless device to another user. The disclosed technology improves over prior techniques with an architecture that supports different processes, which addresses conversion and migration across multiple network carriers that implement incompatible unlocking techniques.

The disclosed unlock technology handles eligibility checks and unlock ineligibility notifications to unlock wireless devices across multiple networks and device types. This cross-carrier architecture contributes to acceleration, simplification, and synergies for migration and conversion of subscribers from a donor network to an anchor network, for various device types, when two networks merge. The technology can also address regulatory and compliance rules that arise when the multiple networks merge. This architecture has applicability with mobile devices in telecommunications networks as well as for other devices and networks and handles more than one wireless carrier for device unlock, especially where networks merge to leverage an existing ecosystem. An orchestration engine processes unlock requests to convert accounts from one standard core platform and migrates a wireless device to another wireless carrier, for various device types that impose their own restrictions. The technology therefore offers cost savings for device unlock functions due to cross-network level centralization.

The unlocking technology thus enables dynamically unlocking multiple device types across different carrier infrastructures that require different unlock processes including reactive and proactive unlock for merged networks. The technology handles unlock policies and processes that parity across both carriers for regulatory compliance. Further, the technology is leveraged by various carrier initiatives and products to simplify migration and conversion by providing a common platform to address a merged network's unlock process to accelerate operational efficiencies. The technology can also include a frontline tool to remotely address unlock request in one call, improves customer experience, and reduce offline support. An implementation includes an enterprise self-service unlock solution for multiple device types with actionable eligibility information based on postpaid and prepaid subscriptions to improve process efficiency. The technology can additionally include frontline dashboard and reporting for managing the system across carriers.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
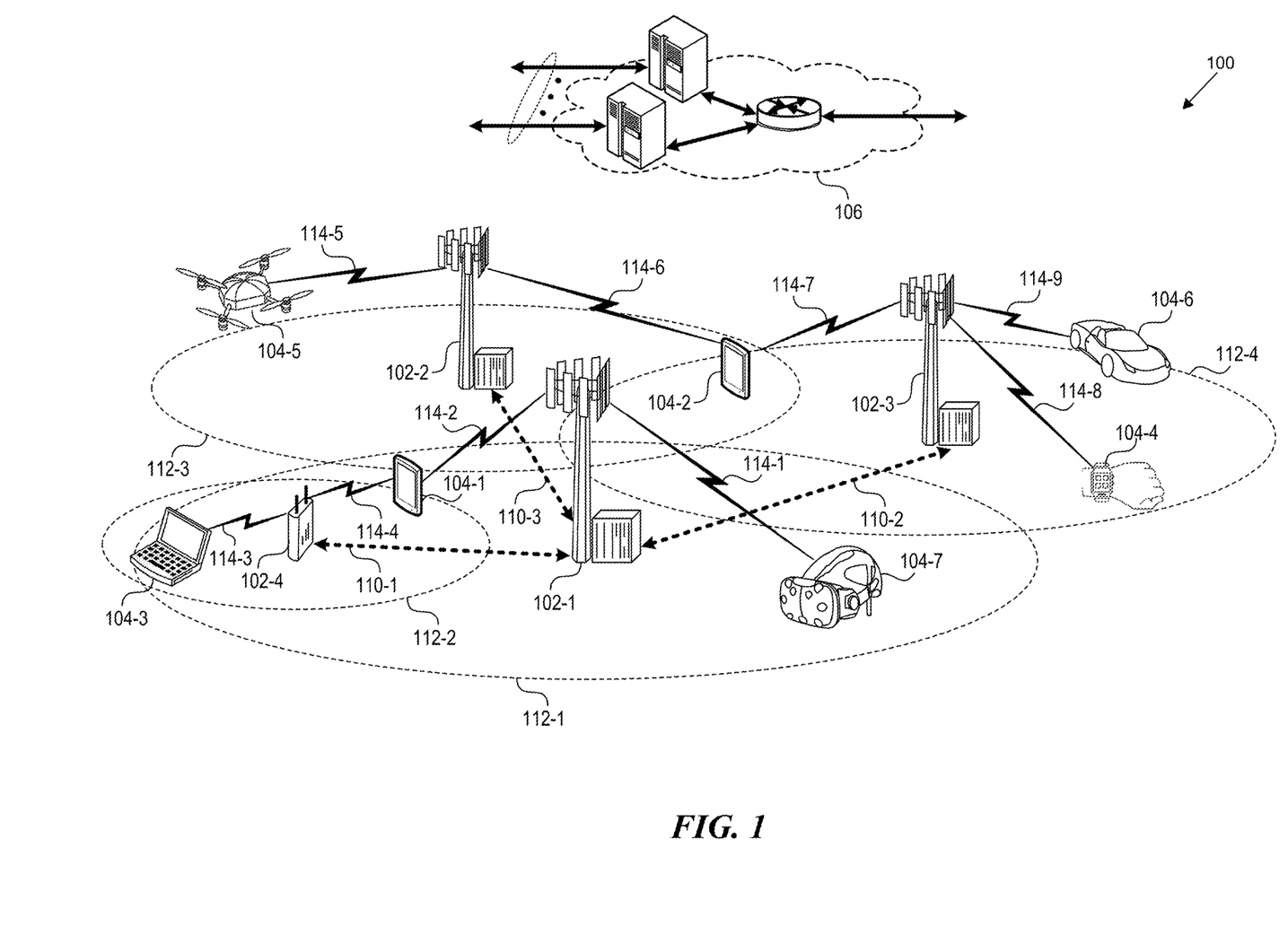
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
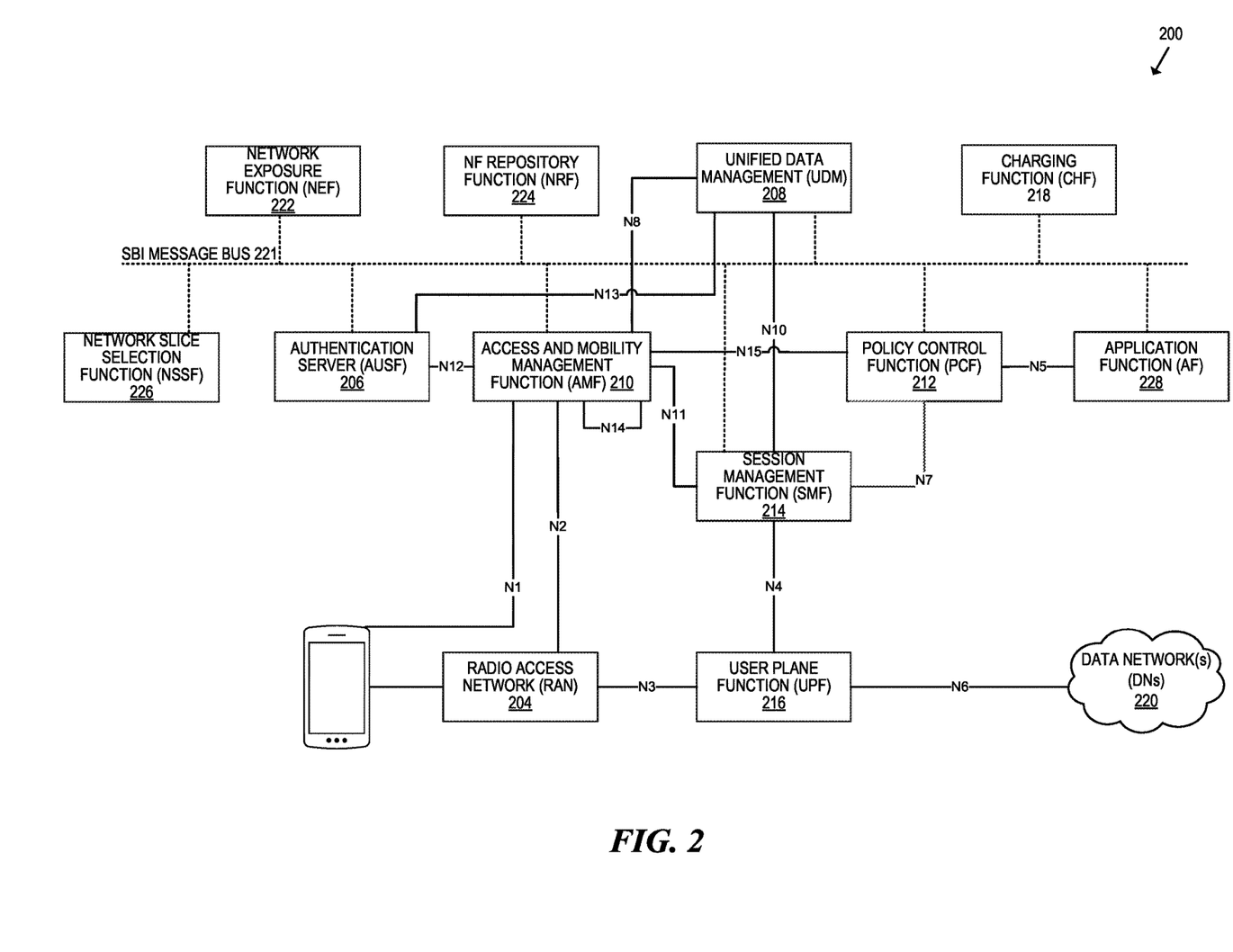
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Interoperable Unlocking System

A defining characteristic of a wireless carrier, also known as a Mobile Network Operator (MNO) or wireless service provider, includes owning or controlling access to a radio spectrum license from a regulatory or government entity. Another defining characteristic is that the wireless carrier owns or controls elements of the network infrastructure necessary to provide services to subscribers over the licensed spectrum such as the elements illustrated in FIG. 1. A wireless carrier typically also has the necessary provisioning, billing, customer care computer systems, and engineering organizations needed to sell, deliver, and bill for services. Examples of wireless carriers include AT&T, Verizon, T-Mobile, and Sprint. A wireless carrier can sell access to network services at set rates to mobile operators. Examples of mobile operators include prepaid wireless service providers such as Metro by T-Mobile, Cricket Wireless, and Visible.

Various network carriers or device manufacturers can implement different locking processes to restrict wireless devices to respective networks. A locking mechanism restricts a wireless device to accept SIM cards with certain International Mobile Subscriber Identities (IMSIs) restricted by a Mobile Country Code (MCC), a Mobile Network Code (MNC), or a Mobile Subscriber Identification Number (MSIN). In addition, wireless device manufacturers such as Apple, Google, and Samsung can impose restrictions that lock their devices. As such, wireless devices are locked by different restrictions for particular wireless carriers, wireless networks, or device types. Accordingly, unlocking wireless devices traditionally requires separate systems and resources that are specific to particular wireless carriers, wireless networks, or device types, which limits the use of wireless devices and stifles network interoperability across two or more wireless networks.

The disclosed technology provides a unified and interoperable way to unlock wireless devices that require different unlocking processes. Examples of different unlocking processes include proactive or reactive processes that require satisfying eligibility defined network systems (e.g., wireless carriers, device types) in policies. In proactive unlocking, an unlocking system monitors the state of wireless devices to detect events that trigger and automatically initiate unlocking processes. An example of an event can include connecting to or attempting to connect to a wireless network. As such, a request to unlock a wireless device is automatically generated, detected, and routed to an unlocking system to initiate an unlocking process. In reactive unlocking, an unlocking system receives an unlock request submitted by a network agent or user (e.g., subscriber) of a wireless device. For example, a user can call a customer service agent of a wireless carrier to unlock the wireless device. The customer service agent can then manually submit the unlock request to the unlocking system to initiate an unlocking process. In another example, a user can use an unlock app on a mobile phone to submit a request to an unlocking system to unlock the mobile phone.

The disclosed unlocking technology uses a centralized orchestration engine that provides interoperability to readily unlock wireless devices that are restricted by different and potentially incompatible policies of different wireless carriers, different wireless networks, or different device manufacturers. The technology is particularly useful when merging networks, where a donor network that implements one unlock mechanism is merged with an anchor network that implements a different unlock mechanism. As such, a wireless carrier of an anchor network can accommodate wireless devices for donor and anchor subscribers, while keeping wireless devices locked from other wireless carriers.

The cross-carrier architecture provides customer and care personnel with a way to unlock a wireless device that can be, for example, either on a legacy donor network or an anchor network. The architecture can uniformly handle eligibility checks, send eligibility notifications, and unlock devices across wireless networks and for various device types. Thus, the architecture contributes to acceleration, simplification, and synergies for migration and conversion of subscribers from the donor network to the anchor network and for various device types while addressing compliance with regulations that arise when networks merge.

Figure 3:
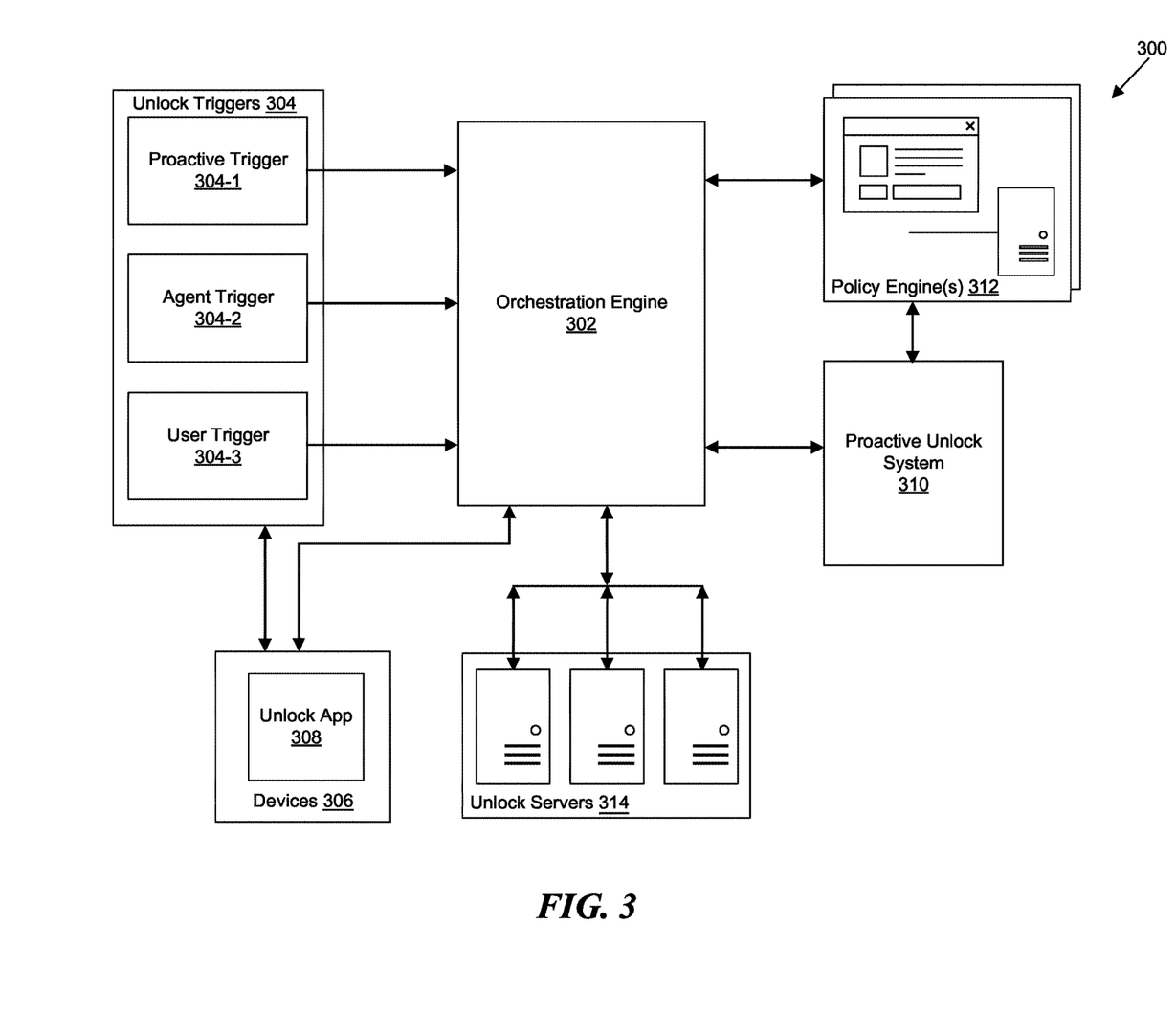
FIG. 3 is a block diagram that illustrates an interoperable unlocking system for wireless devices.

FIG. 3 is a block diagram that illustrates an interoperable unlocking system 300 ("system 300") for wireless devices. The system 300 can systematically identify wireless devices that accept certain SIMs based on original equipment manufacturer (OEM), make/model, firmware version installed, or other specifications. The system 300 can also systematically identify where a wireless device is activated/attached to a network and route an unlock requests to appropriate resources to perform unlock processes. For example, the system 300 can process an unlock request to query resources of a donor network or an anchor network, depending on whether the wireless device is associated with either network.

The system 300 includes an orchestration engine 302 that receives unlock processes and coordinates unlocking across various resources for wireless devices, which are restricted for different network systems. For example, the orchestration engine 302 can identify a suitable eligibility policy of a wireless carrier for an unlock request and direct the unlock request to a corresponding policy engine for eligibility verification, where the policy engine can be selected from among multiple policy engine(s) 312 of different network systems or a single policy engine merges multiple policies for different networks. The system 300 thus provides improved agility for operating wireless devices and cost saving to unlock the wireless devices.

The orchestration engine 302 integrates data and processes of multiple device manufacturers (e.g., Apple, Samsung, Google) and wireless carriers to coordinate actions that unlock a wireless device and find the device's unlock status. The orchestration engine 302 integrates a capability to remotely trigger unlocks based on different unlock processes. For example, for PIN based devices, the orchestration engine 302 can provide the device unlock PIN if a wireless device is eligible for unlock. The orchestration engine 302 can also enable wireless devices to adhere to digital data security protocols, encryption, and compliance.

The orchestration engine 302 provides a range of device unlock functionalities through interfaces to resources. Examples of the interfaces include application programming interfaces (APIs), message to/from consumers or agents, scheduled jobs, batch processes, and file transfer protocol (FTP). Examples of functionalities provided by the orchestration engine 302 include capabilities for business support care systems to identify a particular unlock method for a particular device type, request unlock, and determine an unlock status.

More specifically, the orchestration engine 302 can include real-time, asynchronous, scheduler-based file integrations across carrier systems, middleware platforms, databases, and frontend applications and OEMs to perform device eligibility, unlock, notifications, and reporting processes. The eligibility for an unlock request can be determined using different carrier policies with downstream integration of policy engines, and other systems that manage records for account and device information, REST/SOAP/events-based APIs, and microservices. Thus, the orchestration engine 302 integrates the system 300 to couple reusable and generic APIs, events, files and databases for interoperable device unlock. In one example, the unlock orchestration engine is built on Pivotal Cloud Foundry, Google cloud, Amazon cloud, or other cloud services and utilizes monitoring and logging frameworks for fault management. The capabilities of the orchestration engine 302 can be built using highly scalable and available digital platforms including on-premises and SaaS (e.g., over the internet). Monitoring and logging can be performed by using Splunk, App-D, and dashboards.

The system 300 includes three types of unlock triggers 304 that initiate unlock processes to unlock wireless devices 306. The unlock triggers 304 include a proactive trigger 304-1, an agent trigger 304-2, and a user trigger 304-3. The proactive trigger 304-1 is automatically generated in response to an event detected while monitoring a wireless device as described further below. An agent trigger 304-2 includes an unlock request generated at a customer care frontend tool administered by a network carrier. The unlock request is submitted to the system 300 to unlock a wireless device. A user trigger 304-3 includes a request generated in response to user input to an on-device unlock app 308, such as an unlock app. For example, the system 300 can support Android with unlock app, as well as integration with engineering systems and systems for checking eligibility. The unlock requests trigger unlock processes to check whether the wireless device satisfies eligibility criteria to unlock, to override a policy, or for troubleshooting.

For some device types, an on-device app is supported where eligibility can be checked to unlock a wireless device on demand. In some configurations, unlock can only be triggered from the backend systems. Examples of supported device types include Google, Samsung, Apple, Android with an unlock app, pin based locking mechanism, etc. For a wireless device that is eligible for unlock but is incapable of being remotely unlocked, the orchestration engine 302 can send an SMS notification to the wireless device through a notification engine (not shown) to notify a user of the wireless device about the unlock eligibility. In one example, a carrier's agent can use the orchestration engine 302 to override unlock eligibility criteria for special cases such as liquidation, sold devices, etc.

A proactive unlock system 310 is an example of a system that can manage data used for eligibility policies to asynchronously query or notify the policy engine(s) 312 to check an unlock policy when data changes. If a corresponding policy is satisfied, the unlock orchestration engine 302 is notified to perform an unlock process or notifies a user if the device cannot be automatically unlocked. The proactive unlock system 310 can thus provide data to compare against eligibility criteria, such that the orchestration engine 302 can proactively unlock devices by automatically determining a suitable type of unlock process and orchestrate selected resources to unlock the wireless device.

The policy engine(s) 312 can include rules (e.g., based on eligibility criteria) that supports separate configurable policies per wireless carrier, wireless network, and/or device type. The policy engine(s) 312 are queried by the orchestration engine 302 to gather data needed to evaluate an unlocking policy. The policy engine(s) 312 can identify unlock processes for a wireless device based on manufacturing specifications and route unlock requests to appropriate resources (e.g., Google servers, Apple servers).

The system 300 includes unlock servers 314 that vary by wireless carrier, wireless network, or device types. For example, Google, Samsung, and Apple have their own servers that they operate to unlock wireless devices. An unlock solution includes Open Mobile Alliance (OMA) Device Management (DM), which is a device management protocol specified by the Open Mobile Alliance (OMA) Device Management (DM) with a focus on managing mobile devices. Another unlock solution includes Remote Unlock Server (RSU), which is a type of unlock mechanism for certain device types where a customer initiates an unlock request from a mobile unlock app on device, and the request is served by a centralized orchestration engine for eligibility and unlock. The orchestration engine 302 can communicate with a particular unlock server of the unlock servers 314 to unlock a particular wireless device, if capable of unlocking automatically. The orchestration engine 302 can send notifications (e.g., SMS message) to a wireless device of a customer if user action is needed to complete an unlock process.

The unlock system 300 provides various system integrations. For example, the orchestration engine 302 can integrate with multiple carriers' policy systems and equipment repositories to derive data about devices, sales channel, customer's eligibility criteria, special case scenarios like override, blacklist information in case of fraud, etc. The system 300 can also include a reporting component (not shown) for reporting business intelligence (BI) data on a dashboard to a system administrator.

The unlock technology supports postpaid and prepaid services across different device manufacturers and carriers. For these services, the technology can coordinate eligibility determinations, perform unlock data management for audits, and support various device types. In some examples, the technology supports override of unlock eligibility for certain devices via a batch interface. Additional features can include unlock notification via events, APIs, and database links. For example, the technology can include real-time API based integration, as well as availability to customer/account attributes to determine unlock eligibility and management. Therefore, this cross-carrier architecture integrates unlocking processes for multiple networks and device types that are accessible based on APIs or microservices.

Figure 4:
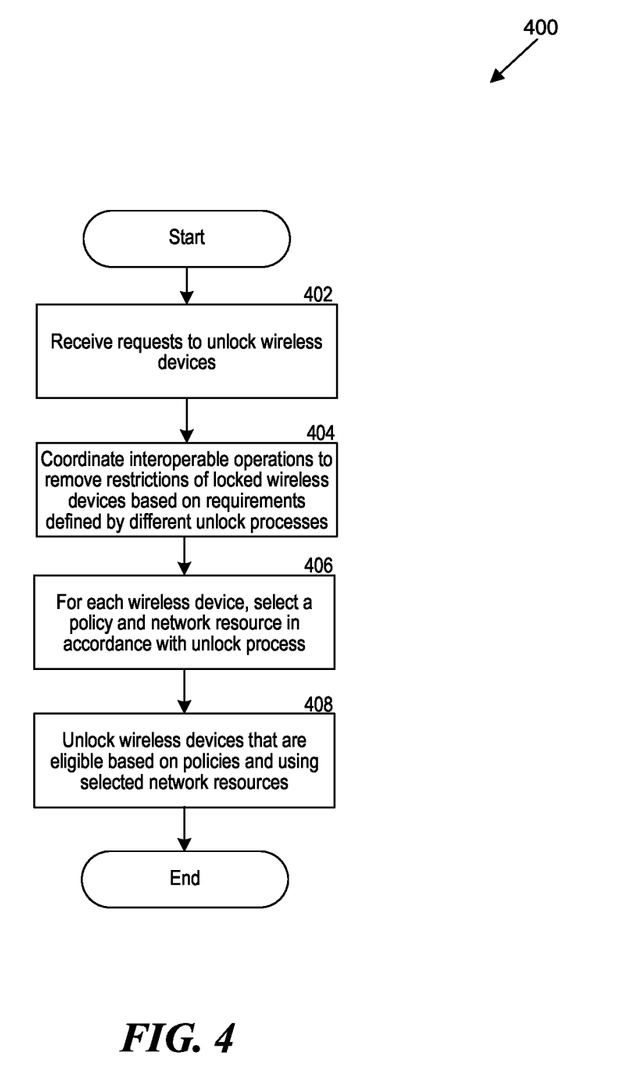
FIG. 4 is a flowchart that illustrates an interoperable process for unlocking different wireless devices.

FIG. 4 is a flowchart that illustrates an interoperable process for unlocking different wireless devices. The process 400 can be performed by a system (e.g., system 300) and/or one or more components such as, for example, an orchestration engine (e.g., orchestration engine 302) in a cross-carrier architecture. The system includes at least one hardware processor and at least one non-transitory memory storing instructions, which, when executed by the at least one hardware processor, cause the system to perform the process 400. The process 400 unlocks wireless devices to operate on other wireless networks. For example, a first telecommunications network can be a donor network and a second telecommunications network can be an anchor network into which the donor network is merged. The donor and anchor networks have different wireless devices that are normally restricted to operate only on their respective networks. By unlocking wireless devices, the carrier of the anchor network can support both donor and anchor wireless devices, regardless of whether the devices were purchased to operate on the donor network or anchor network.

At 402, the system receives requests to unlock the wireless devices. A proactive request is automatically generated and routed to the system based on monitored activities of a wireless device (e.g., connection or attempted network connection). A reactive request is manually submitted and routed to the system based on input from a user of a wireless device or input from an agent of a particular network. For example, an unlock process can be triggered based on user input to an unlock app running on a wireless device. The requests can indicate whether they are proactive or reactive.

The wireless devices are locked based on different restrictions set for wireless carriers, communications networks, and/or device types (e.g., set by device manufacturers). In one example, a restriction can lock a wireless device to accept a SIM card with a certain International Mobile Subscriber Identity (IMSI) restricted by a Mobile Country Code (MCC), a Mobile Network Code (MNC), or a Mobile Subscriber Identification Number (MSIN).

Unlocking wireless devices requires performing specific unlock processes that are configured for carriers, networks, and/or device types for which the wireless devices are restricted. For example, the system can receive multiple requests to unlock wireless devices, where the wireless devices are locked based on different restrictions set for different wireless carriers, different communications networks, and/or different device types. Thus, unlocking wireless devices can require different unlock processes that are normally exclusive to certain wireless carriers, communication networks, and/or device types.

At 404, in response to the requests, the system performs operations that are interoperable to remove the different restrictions from the wireless devices based on requirements defined by corresponding unlock processes. The operations are interoperable because they can unlock wireless devices based on processes that are configured for different carriers, networks, or device types. Normally the unlock processes for the different network systems are handled by separate systems that are administered by the carriers, networks, or device manufacturers that lock (e.g., restrict) the use or operation of the wireless devices. In other words, carriers, networks, and/or device manufacturers control the locking and unlocking mechanisms. As such, the locking and unlocking mechanisms for carriers, networks, and device types that are normally handled by separate systems are handled by a unified system with interoperable operations that combine the separate systems or can query and utilize the separate systems.

In one example, a proactive unlock process automatically monitors whether a wireless device satisfies an eligibility criterion defined in a policy and, if so, automatically allows unlock of the wireless device. In another example, a reactive unlock process is based on user input to determine whether a wireless device satisfies an eligibility criterion defined in a policy to allow unlock of the wireless device. In one example, the system can communicate a notification to a subscriber associated with a wireless device to request input necessary to unlock the wireless device. The notification can be communicated to the locked wireless device or to a device other than the first wireless device. For example, the system can request additional information (e.g., a passcode) in an electronic message communicated to a device for a subscriber to verify the request.

At 406, the system can perform a combination of the interoperable operations to unlock each of the wireless devices. For example, the system determines whether a particular wireless device satisfies an eligibility criterion to unlock the particular wireless device. The eligibility criterion can include an identifier or criteria for the wireless device that are stored at a database indicating a list of eligible wireless devices. A wireless device can be unlocked when the wireless device satisfies the eligibility criterion or if the eligibility criterion is overridden (e.g., by a network administrator).

For each wireless device, the system can check whether the wireless device is eligible for being unlocked and, if so, utilize a particular resource to unlock the wireless device in accordance with the corresponding unlocking process of the wireless device. In particular, the system can identify a policy engine from among multiple policy engines for a wireless device and identify a particular network resource (e.g., unlock server) from among multiple network resources for the particular wireless device.

In one example, the system can use data that identifies the wireless device or associated carrier to identify a network server, a carrier server, and/or a device manufacturer server configured to unlock the wireless device. The system can then connect over a communications network to the identified network server, carrier server, and/or manufacturer server to unlock the wireless device. The system also selects a policy engine from among multiple policy engines based on the identified network server, carrier server, or manufacturer server to perform an eligibility check for unlocking the wireless device. Thus, the servers for a particular unlock process are used to determine eligibility for unlocking and can be used to unlock eligible devices.

At 408, the system unlocks the wireless devices that are eligible based on satisfied criteria defined in the selected policies. The system uses the selected network resources required for the different unlocking processes. For example, for each wireless device, the system can query a particular policy engine for a particular eligibility criterion to unlock a particular wireless device and utilize a particular network resource to unlock the particular wireless device when the particular eligibility criterion is satisfied.

In one example, unlocking a wireless device enables use of the wireless device on a telecommunications network other than the telecommunications network to which the wireless device was originally restricted. In an example where a donor network merges into an anchor network, unlocked wireless devices of the donor and anchor networks can operate on both networks. In one scenario, the wireless devices remain restricted for use only to the merged networks and no other networks. The wireless devices can thus operate simultaneously on both networks. In another scenario, the unlocked wireless devices are unrestricted and can operate on any network including the merged networks. In another scenario, a wireless device is unlocked temporarily and locks after a time period.

Computer System

Figure 5:
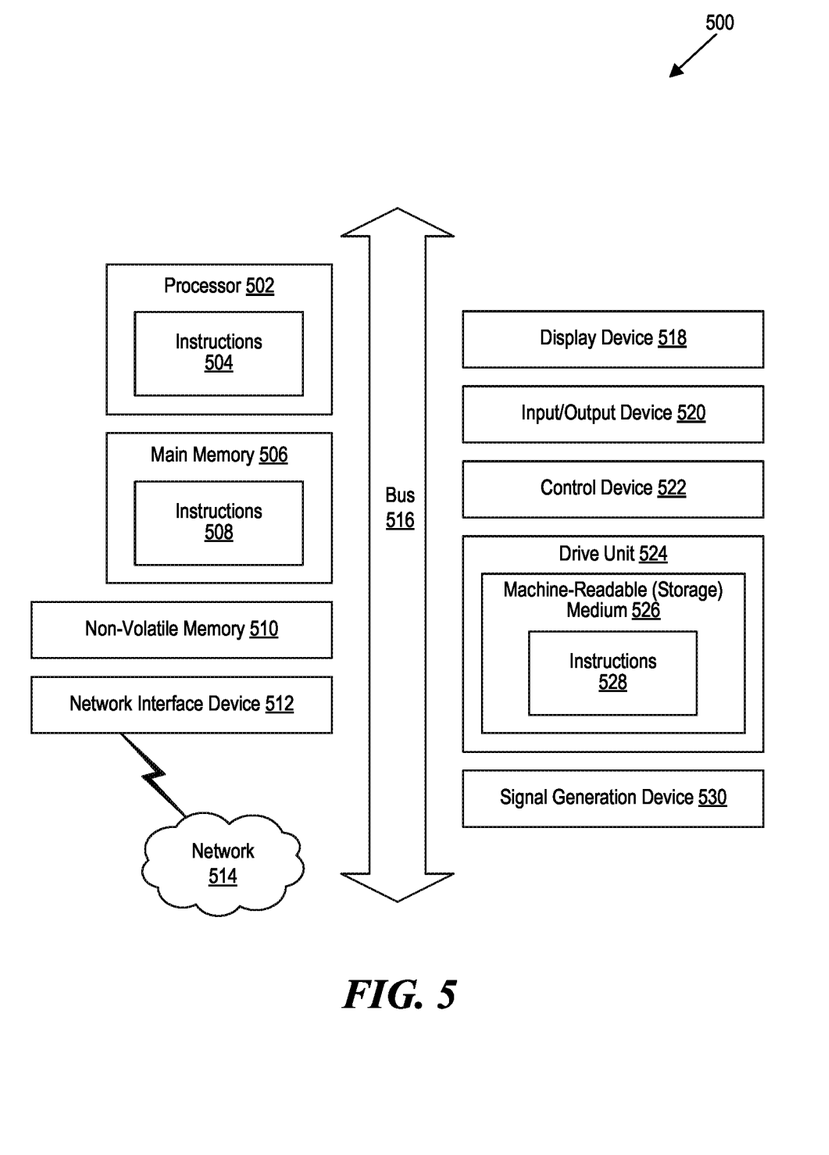
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A non-transitory computer-readable storage medium, excluding transitory signals and carrying instructions, which, when executed by at least one data processor of a system, cause the system to:
   receive a first request to unlock a first wireless device, wherein the first wireless device is locked based on a first restriction set for a first wireless carrier, a first telecommunications network, or a first device type, and wherein to unlock the first wireless device requires performing a first unlock process that is exclusive to the first wireless carrier, the first telecommunications network, or the first device type;
   in response to the first request, coordinate interoperable operations to remove the first restriction from the first wireless device based on requirements defined for the first unlock process;
   receive a second request to unlock a second wireless device, wherein the second wireless device is locked based on a second restriction different from the first restriction and set for a second wireless carrier, a second telecommunications network, or a second device type, and wherein to unlock the second wireless device requires performing a second unlock process that is exclusive to the second wireless carrier, the second telecommunications network, or the second device type and different from the first unlock process;
   in response to the second request, coordinate the interoperable operations to remove the second restriction from the second wireless device based on requirements defined for the second unlock process;
   wherein to coordinate the interoperable operations to remove the first restriction and the second restriction comprises causingthe system to:
   select at least one particular policy engine from among multiple policy engines of different networks for checking eligibility for unlocking the first wireless device and the second wireless device;
   select at least one particular network resource from among multiple network resources of the different networks for unlocking the first wireless device and the second wireless device;
   query the at least one particular policy engine for at least one eligibility criterion to unlock the first wireless device and the second wireless device; and
   utilize the at least one particular network resource to unlock the first wireless device and the second wireless device when the at least one eligibility criterion of at least one particular policy is satisfied.

2. The computer-readable storage medium of claim 1, wherein to receive a particular request to unlock a particular wireless device comprises causing the system to:
   receive an indication that the particular request was automatically generated and routed to the system based on monitored activity of the particular wireless device.

3. The computer-readable storage medium of claim 1, wherein to receive a particular request to unlock a particular wireless device comprises causing the system to:
   receive an indication that the particular request was manually submitted and routed to the system based on input from a user of the particular wireless device or input from an agent of a particular telecommunications network.

4. The computer-readable storage medium of claim 1:
   wherein unlocking the first wireless device enables use of the first wireless device on the second telecommunications network, and
   wherein unlocking the second wireless device enables use of the second wireless device on the first telecommunications network.

5. The computer-readable storage medium of claim 1:
   wherein the first unlock process is a proactive unlock process that automatically monitors whether the first wireless device satisfies a first eligibility criterion defined in a first policy to allow unlocking the first wireless device, and
   wherein the second unlock process is a reactive unlock process based on user input to determine whether the second wireless device satisfies a second eligibility criterion defined in a second policy to allow unlocking the second wireless device.

6. The computer-readable storage medium of claim 1, wherein a particular restriction locks a particular wireless device to accept a SIM card with a certain International Mobile Subscriber Identity (IMSI) restricted by a Mobile Country Code (MCC), a Mobile Network Code (MNC), or a Mobile Subscriber Identification Number (MSIN).

7. The computer-readable storage medium of claim 1, wherein to unlock the first wireless device and the second wireless device comprises causing the system to:
enable the first wireless device and the second wireless device as network agnostic devices.

8. The computer-readable storage medium of claim 1, wherein the first telecommunications network is a donor network and the second telecommunications network is an anchor network into which the donor network is merged.

9. The computer-readable storage medium of claim 1, wherein a particular unlock process is triggered based on user input to an unlock application running on a particular wireless device.

10. The computer-readable storage medium of claim 1, wherein the first unlock process and the second unlock process each comprise causing the system to:
determine whether a wireless device satisfies an eligibility criterion to unlock the wireless device,
wherein the wireless device is unlocked when the wireless device satisfies the eligibility criterion or the eligibility criterion is overridden.

11. The computer-readable storage medium of claim 1 causing the system to:
identify a network server, a carrier server, or a device manufacturer server configured to unlock a particular wireless device;
connect to the identified network server, carrier server, or manufacturer server to unlock the particular wireless device; and
select a policy engine from among multiple policy engines based on the identified network server, carrier server, or manufacturer server to perform an eligibility check for unlocking the particular wireless device.

12. The computer-readable storage medium of claim 1, wherein to unlock the first wireless device comprises causing the system to:
unlock the first wireless device temporarily,
wherein the first wireless device locks after a time period.

13. The computer-readable storage medium of claim 1, wherein to unlock the first wireless device comprises causing the system to:
communicate a notification to a subscriber associated with the first wireless device to request input necessary to unlock the first wireless device,
wherein the notification is communicated to a device other than the first wireless device.

14. An orchestration engine comprising:
at least one hardware processor; and
at least one non-transitory computer-readable storage medium storing instructions, which, when executed by the at least one hardware processor, cause the orchestration engine to:
receive multiple requests to unlock multiple wireless devices, wherein the multiple wireless devices are locked based on different restrictions set respectively for different networks or different device types, and wherein to unlock the multiple wireless devices requires performing different unlock processes that are each exclusive to the different networks or the different device types for which the respective multiple wireless devices are restricted; and
in response to the multiple requests, perform operations that are interoperable to remove the different restrictions from the multiple wireless devices based on requirements defined respectively for the different unlock processes, wherein the operations to remove the different restrictions and to unlock each of the multiple wireless devices comprise causing the orchestration engine to:
identify a particular policy engine from among multiple policy engines of the different networks for checking eligibility for unlocking a particular wireless device of the multiple wireless devices;
identify a particular network resource from among multiple network resources of the different networks for unlocking the particular wireless device;
query the particular policy engine for a particular eligibility criterion to unlock the particular wireless device, and utilize the particular network resource to unlock the particular wireless device when the particular eligibility criterion of a particular policy is satisfied.

15. The orchestration engine of claim 14 further caused to:
enable a first unlocked wireless device to operate on only one additional network, and
enable a second unlocked wireless device to operate on any network.

16. The orchestration engine of claim 14 further caused to:
communicate a notification to a subscriber associated with a first wireless device to request input necessary to unlock the first wireless device.

17. A non-transitory computer-readable storage medium, excluding transitory signals and carrying instructions, which, when executed by at least one data processor of an orchestration engine, cause the orchestration engine to:
receive a first request to unlock a first wireless device, wherein the first wireless device is locked based on a first restriction to operate only on a first particular wireless network of a first particular wireless carrier, and wherein to unlock the first wireless device requires performing a first unlock process that is exclusive to and configured for the first particular wireless network of the first particular wireless carrier;
in response to the first request, coordinate interoperable operations to remove the first restriction from the first wireless device based on requirements defined for the first unlock processes;
receive a second request to unlock a second wireless device, wherein the second wireless device is locked based on a second restriction to operate only on a second particular wireless network of a second particular wireless carrier, and wherein to unlock the second wireless device requires performing a second unlock process that is exclusive to and configured for the second particular wireless network of the second particular wireless carrier;
in response to the second request, coordinate the interoperable operations to remove the second restriction from the second wireless device based on requirements defined for the second unlock processes;

wherein to coordinate the interoperable operations to remove the first restriction and the second restriction comprises causing the orchestration engine to:
select at least one particular policy engine from among multiple policy engines of different networks for checking eligibility for unlocking the first wireless device and the second wireless device;
select at least one particular network resource from among multiple network resources of the different networks for unlocking the first wireless device and the second wireless device;
query the at least one particular policy engine for at least one eligibility criterion to unlock the first wireless device and the second wireless device; and
utilize the at least one particular network resource to unlock the particular first wireless device and the second wireless device when the at least one eligibility criterion of at least one particular policy is satisfied.

18. The computer-readable storage medium of claim 17, wherein to receive the first request to unlock the first wireless device comprises causing the orchestration engine to:

receive an indication that the first request was automatically generated and routed to the orchestration engine based on monitored activity of the first wireless device.

19. The computer-readable storage medium of claim 17, wherein to receive the first request to unlock the first wireless device comprises causing the orchestration engine to:

receive an indication that the first request was based on input from a user to an unlocking app on the first wireless device and routed to the orchestration engine based on the input from the user.

* * * * *